US008464518B2

(12) United States Patent
Ament et al.

(10) Patent No.: US 8,464,518 B2
(45) Date of Patent: Jun. 18, 2013

(54) FUEL VAPOR ENRICHMENT FOR EXHAUST EXOTHERMIC CATALYST LIGHT-OFF

(75) Inventors: Frank Ament, Troy, MI (US); Mary Beth Furness, Ann Arbor, MI (US)

(73) Assignee: GM Global Technology Operations LLC

( * ) Notice: Subject to any disclaimer, the term of this patent is extended or adjusted under 35 U.S.C. 154(b) by 1739 days.

(21) Appl. No.: 10/739,616

(22) Filed: Dec. 18, 2003

(65) Prior Publication Data
US 2005/0132697 A1 Jun. 23, 2005

(51) Int. Cl.
*F01N 3/00* (2006.01)
(52) U.S. Cl.
USPC .................................. 60/289; 60/274; 60/285
(58) Field of Classification Search
USPC ............ 60/274, 276, 283, 285, 289; 123/518, 123/519, 520, 521, 525, 698; 701/102, 103, 701/104, 109
See application file for complete search history.

(56) References Cited

U.S. PATENT DOCUMENTS

| | | | |
|---|---|---|---|
| 4,467,769 A * | 8/1984 | Matsumura | 123/674 |
| 5,111,796 A | 5/1992 | Ogita | |
| 5,272,873 A * | 12/1993 | Hamazaki | 60/283 |
| 5,273,020 A * | 12/1993 | Hayami | 123/520 |
| 5,329,914 A | 7/1994 | Togai et al. | |
| 5,388,403 A * | 2/1995 | Nagami et al. | 60/276 |
| 5,469,832 A * | 11/1995 | Nemoto | 123/682 |
| 5,476,081 A * | 12/1995 | Okawa et al. | 123/478 |
| 5,483,935 A | 1/1996 | Ogawa et al. | |
| 5,544,483 A * | 8/1996 | Heuer | 60/283 |
| 5,685,285 A * | 11/1997 | Ohtani et al. | 123/698 |
| 5,758,631 A * | 6/1998 | Teraoka | 123/674 |
| 5,781,875 A | 7/1998 | Maki et al. | |
| 5,850,820 A * | 12/1998 | Tsutsumi et al. | 123/520 |
| 5,875,765 A | 3/1999 | Norton | |
| 6,176,222 B1 | 1/2001 | Kirwan et al. | |
| 6,234,153 B1 | 5/2001 | DeGroot et al. | |
| 6,237,575 B1 * | 5/2001 | Lampert et al. | 123/520 |
| 6,494,192 B1 | 12/2002 | Capshaw et al. | |
| 6,868,837 B2 * | 3/2005 | Ament | 123/520 |
| 6,912,845 B2 * | 7/2005 | Hirooka | 60/285 |
| 2001/0003977 A1 | 6/2001 | Hayashi et al. | |
| 2004/0040540 A1 | 3/2004 | Blakley | |

* cited by examiner

*Primary Examiner* — Thomas Denion
*Assistant Examiner* — Diem Tran

(57) ABSTRACT

An engine system includes an engine with a secondary air source, a fuel system that communicates with the engine, and a controller that communicates with the fuel system. The controller controls a first quantity of liquid fuel to the engine at a first A/F ratio and a second quantity of vapor fuel to the engine at a second A/F ratio. The liquid and vapor fuel mixture has a third A/F ratio. A secondary air source provides additional air to the third A/F ratio. The controller determines an available A/F ratio of vapor fuel within the fuel tank and performs a comparison with a target A/F ratio range. The second quantity is set to zero if the A/F ratio of the vapor fuel is outside of the target A/F ratio range. The controller adjusts the first and second quantities based on a comparison between an exhaust A/F ratio and a target exhaust A/F ratio.

20 Claims, 4 Drawing Sheets

FUEL VAPOR ENRICHMENT FOR EXHAUST EXOTHERMIC CATALYST LIGHT-OFF

FIELD OF THE INVENTION

The present invention relates to engine control systems, and more particularly to engine control systems that provide vapor enrichment of fuel flowing to an engine during cold start conditions.

BACKGROUND OF THE INVENTION

During combustion, an internal combustion engine oxidizes gasoline and combines hydrogen ($H_2$) and carbon (C) with air. Combustion creates chemical compounds such as carbon dioxide ($CO_2$), water ($H_2O$), carbon monoxide (CO), nitrogen oxides ($NO_x$), unburned hydrocarbons (HC), sulfur oxides ($SO_x$), and other compounds. During an initial startup period after a long soak, the engine is still "cold" and combustion of the gasoline is incomplete. A catalytic converter treats exhaust gases from the engine. During the startup period, the catalytic converter is also "cold" and does not operate optimally.

In one conventional approach, an engine controller commands a lean air/fuel (A/F) ratio thereby reducing the mass of liquid fuel to the engine. More air is available relative to the mass of liquid fuel to sufficiently oxidize the exhaust CO and HC. The resulting exhaust products then heat-up the catalytic converter. However, operating the cold engine at the lean condition can reduce engine stability, adversely impact vehicle drivability, and limits the catalyst warm-up rate.

In another conventional approach, the engine controller commands an excessively fuel-rich mixture which provides stable combustion, good vehicle drivability and excess CO and HC for generating exhaust heat. A secondary air injection system is added to inject air into the rich combustion exhaust products and provide an overall lean exhaust A/F ratio. The additional injected air oxidizes the excess CO and HC in the exhaust, and this releases heat for fast warm-up of the catalytic converter. The warmed catalytic converter then further oxidizes CO and HC in the oxidizing environment provided by the air injection system. Once the catalyst reaches operating temperature, the excess air from the air injection system must be eliminated to provide a stoichiometric exhaust A/F ratio for the catalyst to simultaneously reduce HC, CO and NOx emissions.

To ensure consistent CO and HC exhaust combustion, secondary air injection systems typically require much richer A/F ratios (20-30% more) than would be required for stable engine operation. However, injecting excess liquid fuel into a cold engine to generate a very fuel-rich exhaust mixture leads to excessive fuel wetting of the engine intake and cylinder surfaces. This results in high, uncontrolled HC emissions, oil contamination, spark ignition problems and increased fuel consumption.

SUMMARY OF THE INVENTION

An engine system according to the present invention includes an engine including a secondary air source, a fuel system that communicates with the engine, and a controller that communicates with the fuel system. The controller controls a first quantity of liquid fuel to the engine at a first A/F ratio and a second quantity of vapor fuel to the engine at a second A/F ratio when the secondary air source is operational. The liquid and vapor fuel provide a fuel mixture having a third A/F ratio.

In other features, the controller controls an initial A/F ratio of liquid fuel supplied to the engine and estimates the third A/F ratio based thereon.

In yet other features, the controller determines an available A/F ratio of vapor fuel within the fuel tank and performs a comparison with a target A/F ratio range. The second quantity is set to zero if the A/F ratio of the vapor fuel is outside of the target A/F ratio range.

In still other features, the controller receives an exhaust A/F ratio from an exhaust A/F ratio sensor and compares the exhaust A/F ratio to a target A/F ratio range. The controller adjusts the first and second quantities if the exhaust A/F ratio is outside of the target A/F ratio range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
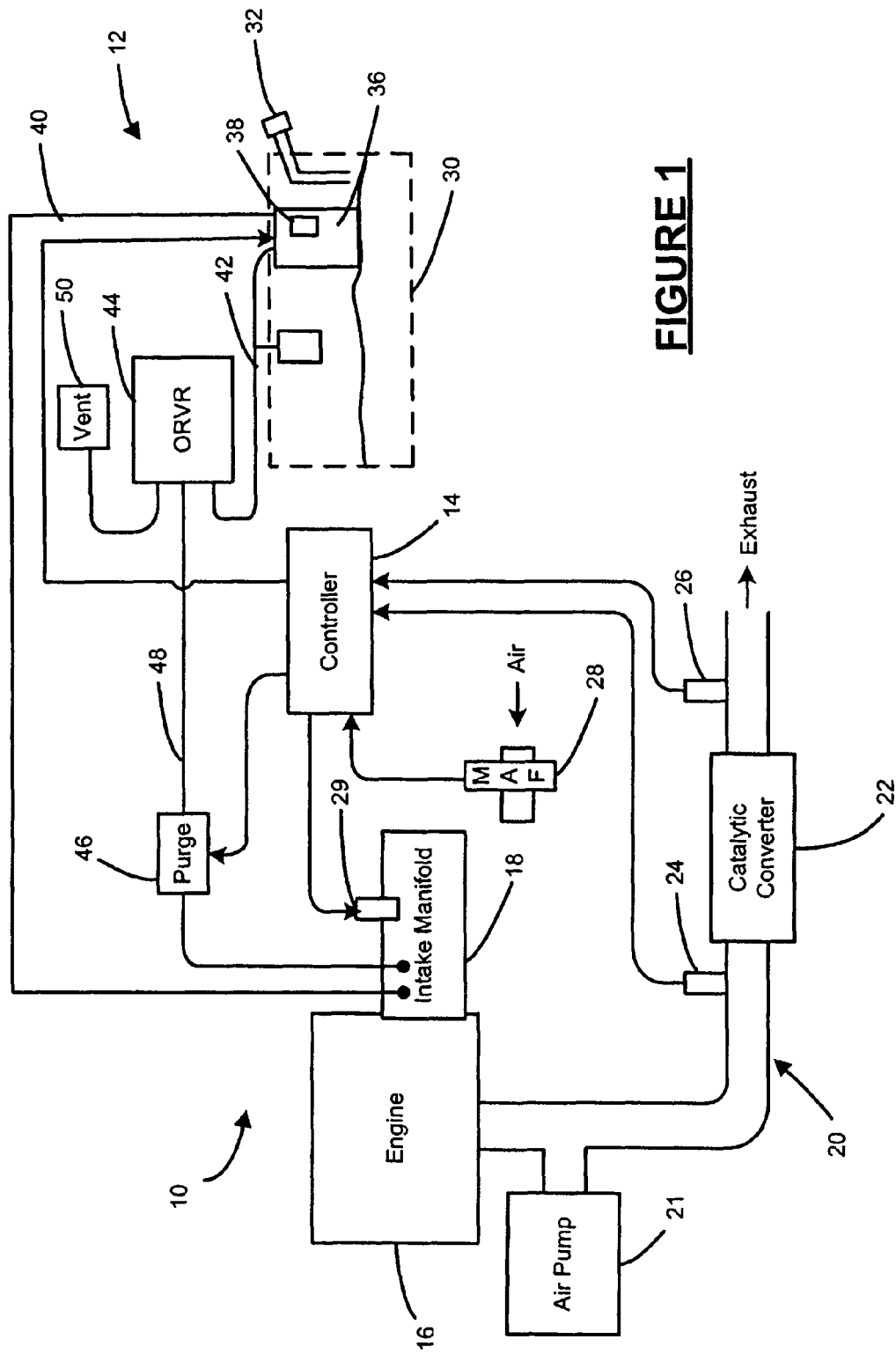
FIG. 1 is a functional block diagram of an engine control system including a secondary air source and a fuel system.

The following description of the preferred embodiment(s) is merely exemplary in nature and is in no way intended to limit the invention, its application, or uses. For purposes of clarity, the same reference numbers will be used in the drawings to identify similar elements.

Referring to FIG. 1, an engine system 10 and a fuel system 12 are shown. One or more controllers 14 communicate with the engine and fuel systems 10, 12. The fuel system 12 selectively supplies liquid and/or vapor fuel to the engine system 10, as will be described in further detail below. [0018] The engine system 10 includes an engine 16, an intake manifold 18, an exhaust manifold 20, and a secondary air source 21. Air and fuel are drawn into the engine 16 and combusted therein. The secondary air source 21 supplies additional air to the rich exhaust gas flowing through the exhaust manifold 20. The combined gases are treated in a catalytic converter 22. First and second exhaust air-fuel sensors 24 and 26 communicate with the controller 14 and provide exhaust A/F ratio signals to the controller 14. The exhaust air-fuel fuel sensors can be stoichiometric switching $O_2$ or wide-range air-fuel sensors. In practice, the catalyst outlet sensor 26 is typically a switching O2 sensor. A mass air flow (MAF) sensor 28 is located within an air inlet and provides a mass air flow (MAF) signal based on the mass of air flowing into the intake manifold 18. The controller 14 uses the MAF signal to determine the amount of fuel required by the engine 16. An intake manifold temperature sensor 29 generates an intake air temperature signal that is sent to the controller 14.

The fuel system 12 includes a fuel tank 30 that contains liquid fuel and fuel vapors. A fuel inlet 32 extends from the fuel tank 30 to allow fuel filling. A fuel cap 34 closes the fuel inlet 32 and may include a bleed hole (not shown). A modular reservoir assembly (MRA) 36 is disposed within the fuel tank 30 and includes a fuel pump 38. The MRA 36 includes a liquid fuel line 40 and a vapor fuel line 42.

The fuel pump 38 pumps liquid fuel through the liquid fuel line 40 to the engine 16. The fuel is delivered to the intake manifold 18 by fuel injectors. Vapor fuel flows through the vapor fuel line 42 into an on-board refueling vapor recovery (ORVR) canister 44. A vapor fuel line 48 connects a purge solenoid valve 46 to the ORVR canister 44. The controller 14 modulates the purge solenoid valve 46 to selectively enable vapor fuel flow to the engine 16. The controller 14 modulates a canister vent solenoid valve 50 to selectively enable air flow from atmosphere into the ORVR canister 44.

Figure 2:
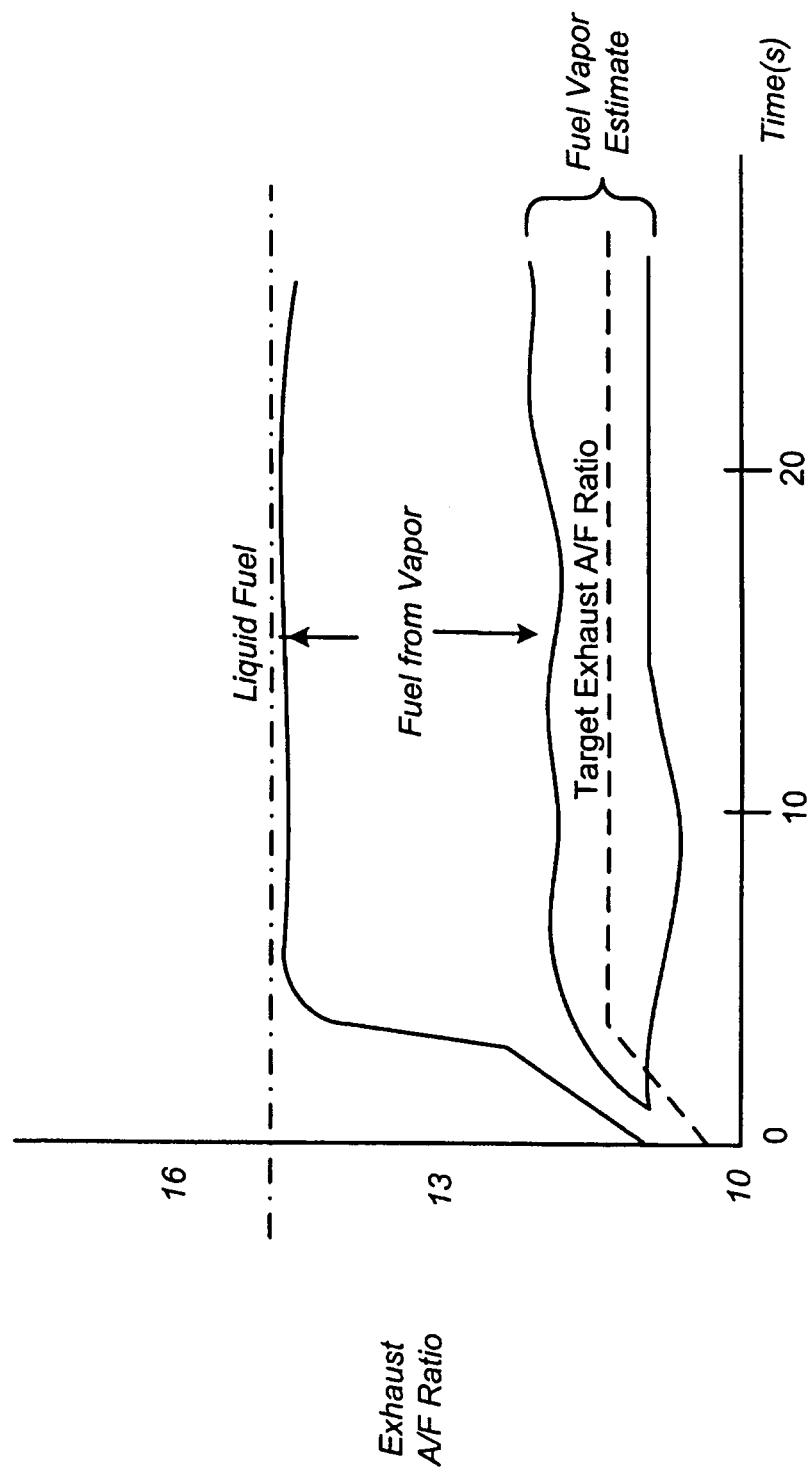
FIG. 2 is a graph illustrating a liquid fuel A/F ratio and a vapor fuel A/F ratio according to the present invention.
Figure 3:
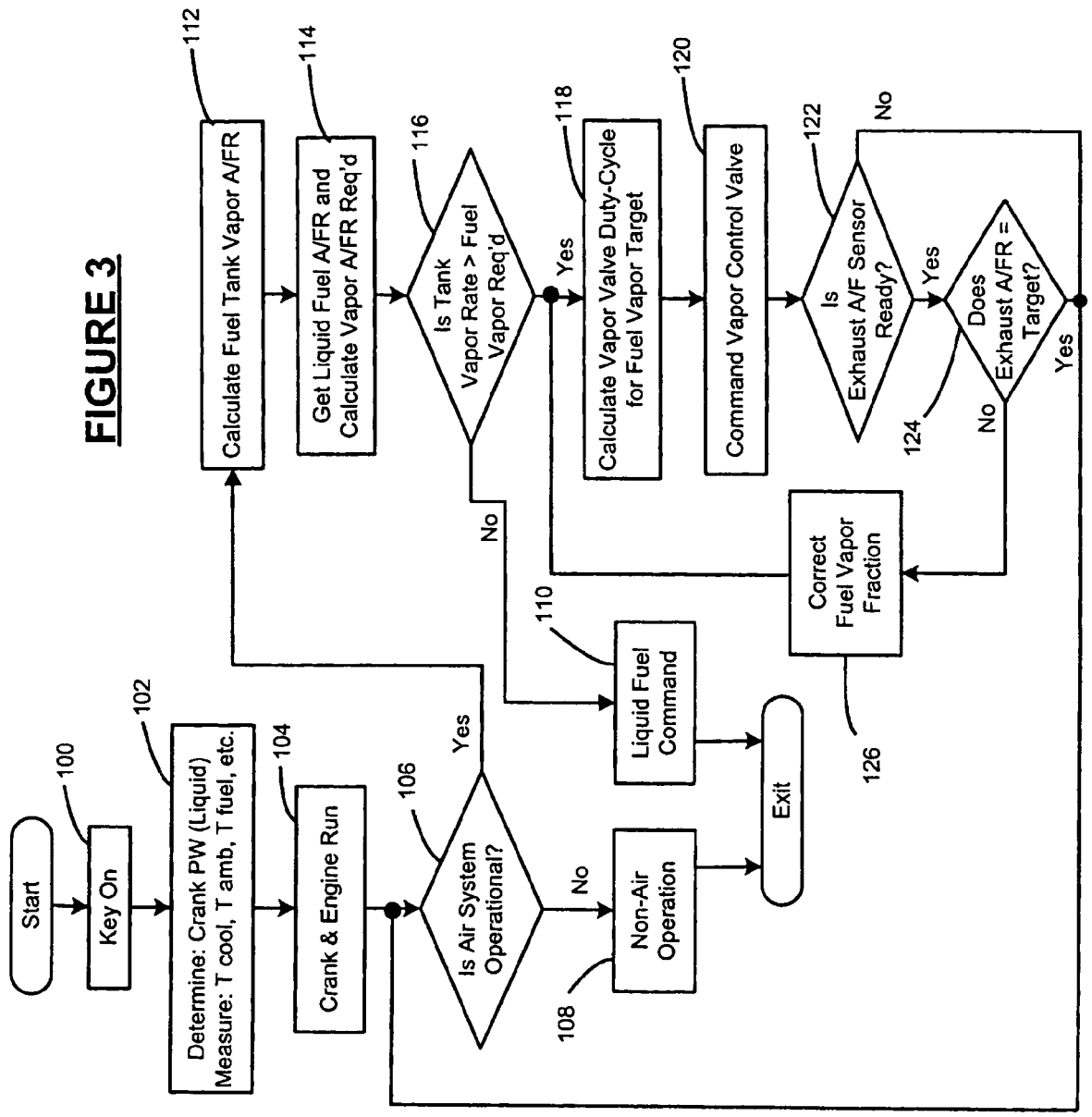
FIG. 3 is a flowchart showing steps of a fuel vapor enrichment control method according to the present invention.

Referring to FIGS. 2 and 3, a fuel vapor enrichment control method will be described in further detail. In general, vapor fuel is used to supplement and enrich the A/F mixture during engine 16 and secondary air source 21 operation. The vapor fuel within the fuel tank 30 retains a predictable A/F ratio between engine cold starts. The A/F ratio of the fuel can be estimated based on temperature and a Reid vapor pressure (RVP) rating of the fuel. In an exemplary manner, the RVP value of the fuel is estimated during closed loop, steady-state engine operation based on a hydrocarbon purge flow and the temperature of the fuel tank 30.

The tank vapor fuel is typically very rich. Therefore, a relatively small amount of vapor fuel is able to provide a significant portion of the fuel required to compensate the engine 16. Vapor fuel is present within the fuel tank 30 at atmospheric pressure. A sufficient amount of vapor fuel is usually available to handle throttle crowds and step-in maneuvers. As shown graphically in FIG. 2, fuel vapor having an A/F ratio within the designated range of approximately 2 to approximately 3, can be supplied in conjunction with liquid fuel having an A/F ratio of up to 14.7 to achieve a rich target exhaust A/F ratio of less than 12. Additional air supplied by the secondary air source 21 allows the extra fuel to be combusted in the exhaust 20 and the catalytic converter 22. This method of adding exhaust energy is used to heat a catalytic converter 22 located further downstream from the engine 16.

As detailed in FIG. 3, after a key-on event occurs in step 100, the controller 14 determines the amount of liquid fuel required during engine crank (i.e. initial ignition). Currently available parameters including engine coolant temperature ($T_{COOL}$), ambient air temperature ($T_{AMB}$), and fuel temperature ($T_{FUEL}$) are measured in step 102. In step 104, the engine is cranked and initially runs and burns the liquid fuel having an initial A/F ratio. In step 106, the secondary air source is checked for operation. In one embodiment, the secondary air source will operate when $T_{COOL}$ and $T_{AMB}$ are within a temperature range, although other operational conditions can be used. The temperature range for $T_{COOL}$ is approximately 4.4° C. to approximately 50° C. and for $T_{AMB}$ is approximately 4.4° C. to approximately 60° C. If the air system is operational, the controller initiates a vapor enrichment mode. If the air system is not operational, the controller operates the engine in a non-air operation mode.

Depending on the application, the non-air operating mode can use a liquid fuel only calibration, typically 10-15% rich of stoichiometry, or it can use a Vapor Assist calibration. The non-air operation mode with Vapor Assist is described in "Cold Start Fuel Vapor Enrichment," (U.S. Ser. No. 10/383,783), expressly incorporated herein by reference in its entirety.

In the vapor enrichment mode, the A/F ratio of the vapor fuel within the fuel tank is estimated in step 112. In step 114, the present liquid fuel A/F ratio is determined and the target vapor fuel A/F ratio is calculated. The vapor fuel A/F ratio is compared to the target vapor fuel A/F ratio in step 116. The vapor fuel rate is then calculated. If the vapor fuel rate is insufficient (i.e. less than the target vapor fuel rate), control continues with step 110. In step 110, the controller operates the engine using liquid fuel. If the vapor fuel rate is sufficient (i.e. greater than the target vapor fuel rate), control continues with step 118. In step 118, a duty-cycle for the purge solenoid valve 46 is calculated to achieve the appropriate flow of vapor fuel into the engine 16. In step 120, the controller 14 operates the vapor control valve at the calculated duty-cycle.

In step 122, the controller 14 determines whether the first exhaust air-fuel sensor is ready to provide an exhaust A/F ratio measurement. If the first exhaust air-fuel sensor is not ready, control loops back to step 106. If the first exhaust air-fuel sensor is ready, the controller 14 continues with step 124 where a measured exhaust A/F ratio is compared to the target exhaust A/F ratio. If the exhaust A/F ratio is equal to the target exhaust A/F ratio, control loops back to step 106. However, if the exhaust A/F ratio is not equal to the target exhaust A/F ratio, control continues with step 126. In step 126, the vapor fuel supply is adjusted using the purge solenoid valve duty cycle in step 118.

When the air system is operational and there exists sufficient fuel tank vapor, control continuously loops through the vapor enrichment mode. Normal engine operation will commence upon sufficient heating of the catalytic converter.

Figure 4:
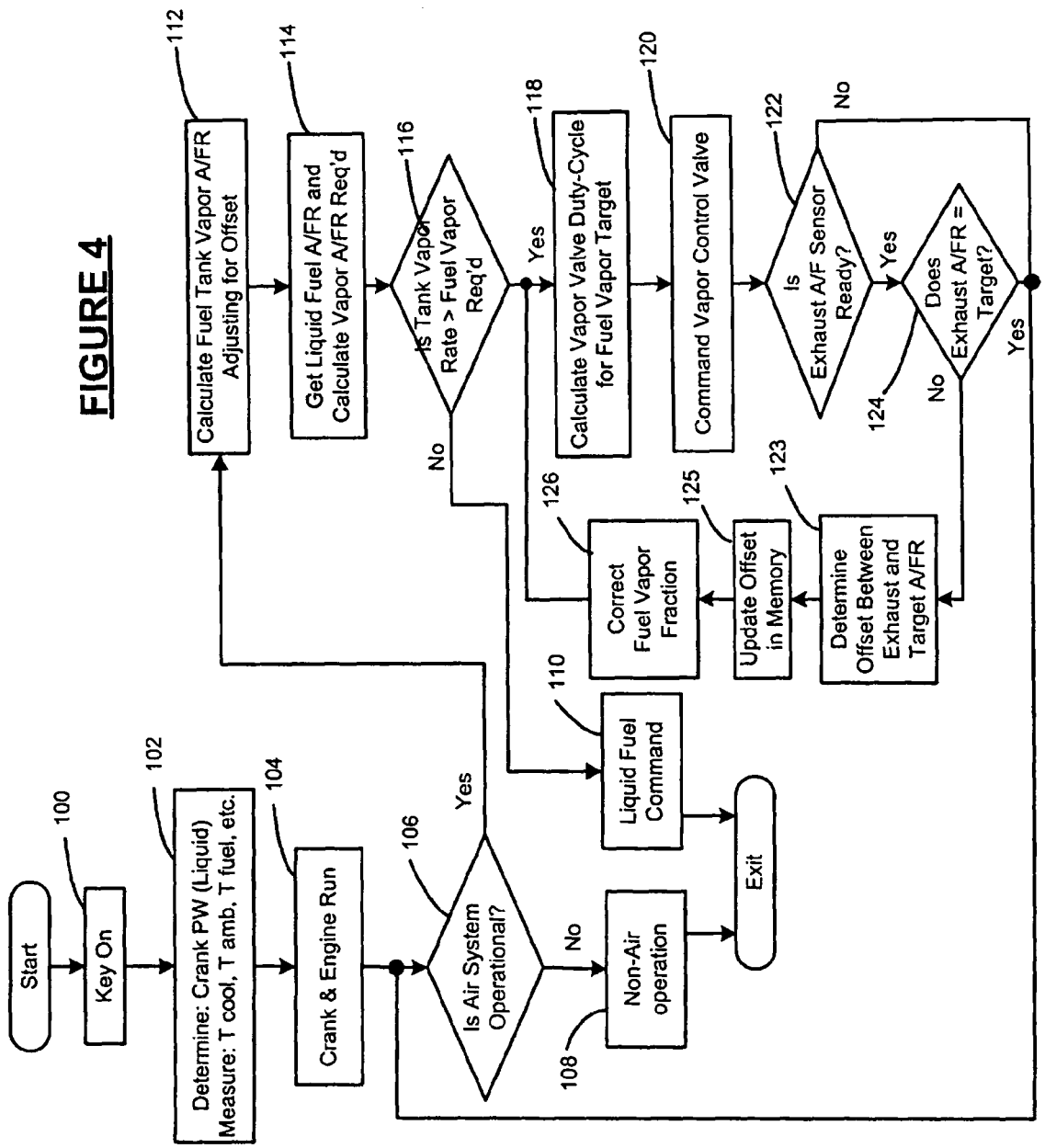
FIG. 4 is a flowchart showing steps of the fuel vapor enrichment control method including determining an A/F ratio offset.

With reference to FIG. 4, the fuel tank vapor A/F ratio calculated in step 112 can be trimmed or corrected. In step 123, an offset is calculated as the difference between the exhaust A/F ratio and the target exhaust A/F ratio. The offset is updated in memory in step 125 as control loops through the vapor enrichment mode. Upon the next cold-start of the vehicle, calculation of the fuel tank vapor A/F ratio in step 112 takes into account the offset value stored in memory. This enables more accurate control of the A/F ratios. The offset value can be compared with the RVP estimate to further improve the vapor A/F ratio estimate.

The cold start fuel vapor enrichment control method of the present invention reduces the amount of liquid fuel that is required during engine cold start and warm up. This reduces the HC emissions in the engine exhaust before the catalyst is active. Further, the engine is able to operate with a rich A/F ratio and the excess exhaust CO and HC can be combusted with secondary air injection to generate additional heat to enable quick catalyst warm-up.

Using fuel vapor to provide the exhaust combustibles also offers the potential for reducing the secondary air injection flow requirement compared to the liquid fuel only case. Because less liquid fuel reaches the combustion chamber, and the excess fuel vapor is already highly volatile, the resulting rich A/F ratio in the combustion will burn quicker and at a higher temperature. This would allow running lower levels of exhaust CO and HC and still generating the necessary exhaust temperatures needed for catalyst warm-up. By using fuel vapor to replace the excess liquid fuel needed for the excessively rich exhaust A/F ratio, lower flow, less costly air injection systems, such as pulsed air are also viable.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine system including an engine, an exhaust system, and a fuel system that communicates with the engine, comprising:
   a controller that communicates with the fuel system and that controls a first quantity of liquid fuel to the engine at a first air/fuel (A/F) ratio and a second quantity of vapor fuel to the engine at a second A/F ratio to provide a fuel mixture having a third A/F ratio; and
   a secondary air source that operates in at least one of an on state and an off state and when operating in said on state supplies air to the exhaust system to increase said third A/F ratio,
   wherein said controller receives an indication of said at least one of said on state and said off state and adjusts said first quantity of liquid fuel and said second quantity of vapor fuel based on said indication, and
   wherein said controller further receives an exhaust A/F ratio from an exhaust A/F ratio sensor, compares said exhaust A/F ratio to a target A/F ratio range, and adjusts said first and second quantities when said exhaust A/F ratio is outside of said target A/F ratio range.

2. The engine system of claim 1 wherein said first A/F ratio is lower than a stoichiometric A/F ratio.

3. The engine system of claim 1 wherein said controller controls an initial A/F ratio of liquid fuel supplied to the engine and estimates said third A/F ratio based thereon.

4. The engine system of claim 1 wherein said controller calculates an NF ratio offset based on said exhaust A/F ratio and a target A/F ratio.

5. The engine system of claim 1 wherein said controller determines an available A/F ratio of vapor fuel within the fuel system, performs a comparison with a target A/F ratio range, and wherein said second quantity is set to zero if said A/F ratio of said vapor fuel is outside of said target A/F ratio range.

6. The engine system of claim 5 wherein said controller adjusts said available A/F ratio based on an A/F ratio offset.

7. A method of operating a combustion engine with a secondary air source, comprising:
   supplying liquid fuel having a first A/F ratio to the engine;
   receiving an indication of an operational state of the secondary air source;
   supplying liquid fuel at a second A/F ratio and vapor fuel at a third A/F ratio to the engine based on said indication to produce an exhaust A/F ratio;
   receiving a second exhaust A/F ratio from an exhaust A/F ratio sensor
   comparing said second exhaust A/F ratio to a target A/F ratio; and
   adjusting flow of said liquid fuel and said vapor fuel when said second exhaust A/F ratio is not equal to said target A/F ratio.

8. The method of claim 7 wherein said second A/F ratio is less than a stoichiometric A/F ratio.

9. The method of claim 7 further comprising calculating said third A/F ratio based on said first A/F ratio.

10. The method of claim 7 further comprising controlling a valve in communication with a supply of vapor fuel to regulate said vapor fuel.

11. The method of claim 7 further comprising:
   determining an A/F ratio offset based on said second exhaust A/F ratio and said target A/F ratio;
   storing said A/F ratio offset; and
   adjusting said third A/F ratio based on said A/F ratio offset.

12. The method of claim 7 further comprising:
   determining an available A/F ratio of vapor fuel within a fuel tank; and
   comparing said available A/F ratio with a target A/F ratio range, wherein said third A/F ratio is zero if said available A/F ratio is outside of said target A/F ratio range.

13. The method of claim 12 further comprising adjusting said available A/F ratio based on an A/F ratio offset.

14. A method of operating a combustion engine with a secondary air source comprising:
   receiving an indication of an operational state of the secondary air source;
   determining a first A/F ratio of a first supply of liquid fuel;
   determining a second A/F ratio of a second supply of vapor fuel based on said first A/F ratio and said indication;
   supplying said first supply of liquid fuel and said second supply of vapor fuel to the engine;
   supplying air to exhaust gas from the engine while the secondary air source is operational;
   comparing an exhaust A/F ratio to a target A/F ratio; and
   adjusting said first supply and second supply when said exhaust A/F ratio is not equal to said target A/F ratio.

15. The method of claim 14 wherein said first A/F ratio is less than a stoichiometric A/F ratio.

16. The method of claim 14 further comprising controlling a valve in communication with a supply of vapor fuel to regulate said second supply of vapor fuel.

17. The method of claim 14 further comprising:
   determining a third A/F ratio of a third supply of liquid fuel supplied to said engine during starting; and
   calculating said second A/F ratio based on said third A/F ratio.

18. The method of claim 17 further comprising:
   determining an A/F ratio offset based on said exhaust A/F ratio and said target A/F ratio;
   storing said A/F ratio offset; and
   adjusting said third A/F ratio based on said A/F ratio offset.

19. The method of claim 14 further comprising:
   determining an available A/F ratio of vapor fuel within a fuel tank; and
   comparing said available A/F ratio with a target A/F ratio range, wherein said second supply is zero if said available A/F ratio is outside of said target A/F ratio range.

20. The method of claim 19 further comprising adjusting said available A/F ratio based on an A/F ratio offset.